2,964,561
Patented Dec. 13, 1960

2,964,561

STABILIZATION OF AROMATIC AMINES

James B. Normington, Little Silver, and Eugene V. Hort, Westfield, N.J., and Harlan B. Freyermuth, Easton, Pa., assignors to General Aniline & Film Corporation, New York, N.Y., a corporation of Delaware No Drawing. Filed July 26, 1956, Ser. No. 600,156

5 Claims. (Cl. 260—578)

The invention here presented is a new composition of matter and a new procedure for the production of stabilized aromatic amines which may be stored for substantial periods of time without deterioration; by the addition to the aromatic amines of immiscible liquid protectants which coat the particles of the amines and protect them from the atmosphere.

The aromatic amines such as metaphenylenediamine, the various aromatic tolueneamines and the diamines, aniline, aminophenols, and the like, are all important intermediates for the making of a wide range of organic compounds including dyestuffs, pharmaceuticals, polymers and the like. All of them are more or less susceptible to deterioration on storage, mainly because of the absorption of, and combination with, oxygen, moisture and the like. This characteristic makes it necessary to use the amines within a very short time after their preparation, or if they must be stored, it is usually necessary to subject them to a purification step immediately before use, entailing undesirable costs and loss of valuable products.

According to the present invention, it is now found that if the amines are treated immediately after the close of the manufacturing process, with a more or less oxygen-impervious coating, the stability is outstandingly improved, and amines which, unprotected, show substantial deterioration and oxidation in a matter of a few hours, will, when protected, according to the present invention, show no significant deterioration over a period of many days or weeks. Furthermore the presence of silicone oils, hydrocarbon oils and the like, used for the protecting coating, is found to be unobjectionable in most of the processes in which the amines are used.

Thus the process and product of the invention are found in coated amines, in which a thin coating of oxygen-impervious material has been applied to the amines. Other objects and details of the invention will be apparent from the following description.

The invention is applicable to all of the amines, for the stabilization thereof against deterioration during storage. The invention is particularly applicable to the aryl diamines which tend to deteriorate upon storage very rapidly, but it is also applicable to the monoamines such as aniline, aminophenols, other polyamines, the various halogenated anilines, and all of the homologous amines.

The second component of the invention then is the coating compound, preferably of lower specific gravity that the amine. This can be a silicone oil, hydrocarbon oil, ranging from light oil to paraffin. Various other oily compounds are also usable; such as hydrogenated cottonseed oil or hydrogenated coconut oil or the like, as well as low polymers of isobutylene or ethylene.

In practicing the process of the invention, to produce the protected product, it is only necessary that all of the particles of the amine be covered with a thin film of the oil. If the amine is to be kept in granulated or powdered form, a sufficient amount of the coating oil is added to the granular product and the mixture stirred or rolled until the oil is thoroughly dispersed onto the granules of amine. If the amine is one which is conveniently melted and poured into a container so that a solid body of amines is produced in the container, it is only necessary to add a small amount of the coating compound onto the surface of the amine; sufficient should be provided, however, to fill in cracks which may appear in the contents of the container from the effect of temperature changes. Alternatively, if the amine has a sufficiently low melting point and is unharmed by melting, it may conveniently be melted and the coating oil mixed into it. This procedure is particularly advantageous since it gives a coating on the resulting crystals and in the intercrystalline cracks with the result that a very thorough and effective coating is obtained and at the same time the solid amine disintegrates readily to permit of easy removal from the container. Also the coating may be floated on the surface of a liquid amine to protect it in the liquid state.

The following examples are offered as showing the best known procedure for the production of the protected amines, but are not intended to impose any limitations upon the claims solicited.

*Example 1*

5 grams of freshly distilled toluene diamine (containing 80% of the 2,4 and 20% 2,6 isomers) was melted in a Pyrex test-tube and 0.5 g. silicone oil 9981 LT 40 NV was added and the diamine allowed to cool and solidify at room temperature. A control without the silicone oil was prepared. After several days standing, the control became very dark in color while the toluene diamine which was covered with silicone oil changed only slightly in color.

*Example 2*

The procedure of Example 1 was followed except 0.5 gram of Nujol was used in place of 0.5 g. of silicone oil.

*Example 3*

The procedure of Example 1 was followed except that 0.5 g. melted paraffin wax was used in place of 0.5 g. silicone oil.

*Example 4*

A portion of m-phenylene diamine was milled in a pebble mill with approximately 0.5% of a medium heavy silicone oil, and treated samples were set aside with untreated samples for observation. The untreated samples darkened and blackened within less than 24 hours, whereas the treated portion remained light in color for a matter of several weeks.

*Example 5*

A portion of aniline was stored under a surface coating of light silicone oil. The aniline was freshly distilled and almost water white. Along with the treated sample there was also stored an untreated sample. The untreated sample showed a marked reddening within a very few days, as is always observed with stored aniline; whereas the treated portion retained its original, almost water white color for a matter of several weeks.

*Example 6*

A portion of ortho-toluidine was distilled directly into a receiver having therein a small amount of silicone oil, the distillation being continued until the amount of silicone oil present was approximately 0.1% of the freshly distilled ortho-toluidine. When this stage was reached, the receivers were changed and a further portion distilled into the second receiver which contained no silicone oil. The contents of the second receiver turned a deep red within 4 hours when stored at 95° C., whereas the portion containing the silicone oil still had its original light color after storage for 24 hours at 95° C., and storage for several weeks at room temperature.

Thus the process of the invention coats an amine with an oxygen-impervious coating to produce a storage stable amine.

While there are above disclosed but a limited number of the process and product of the invention, it is possible to provide still other embodiments without departing from the inventive concept herein disclosed, and it is therefore desired that only such limitations be imposed upon the appended claims as are stated therein or required by the prior art.

The invention claimed is:

1. A stabilized solid aromatic amine consisting essentially of particles of a solid aromatic amine, selected from the group consisting of phenylenediamines and toluene-diamines, having a coating thereon of a viscous oil selected from the group consisting of hydrocarbon oils and silicone oils.

2. A composition as defined in claim 1 wherein the oil specified is a hydrocarbon oil.

3. A composition as defined in claim 1 wherein the viscous oil specified is a silicone oil.

4. A method of protecting a solid aromatic amine, selected from the group consisting of phenylenediamines and toluene-diamines, from degradation on storage which comprises melting said amine, adding thereto a small amount of a viscous oil selected from the group consisting of hydrocarbon oils and silicone oils, and permitting said amine to crystallize, whereby there is obtained crystals of said amine having a coating thereon of said oil.

5. A method protecting a solid aromatic amine, selected from the group consisting of phenylenediamines and toluene-diamines, from degradation on storage which comprises intimately mixing particles of said amine with a viscous oil selected from the group consisting of hydrocarbon oils and silicone oils to thereby coat the particles of said amine with a thin layer of said oil.

References Cited in the file of this patent

UNITED STATES PATENTS

| | | |
|---|---|---|
| 1,762,108 | Stuart | June 3, 1930 |
| 1,835,682 | Zuckermandel | Dec. 8, 1931 |
| 2,178,769 | Wiezevich | Nov. 7, 1939 |
| 2,281,894 | Von Fuchs et al. | May 5, 1942 |
| 2,326,984 | Tomlin | Aug. 17, 1943 |
| 2,528,186 | Stanley et al. | Oct. 31, 1950 |
| 2,556,728 | Graham | June 12, 1951 |
| 2,716,594 | Harris et al. | Aug. 30, 1955 |
| 2,735,816 | Merker et al. | Feb. 21, 1956 |

FOREIGN PATENTS

| | | |
|---|---|---|
| 731,323 | Great Britain | June 8, 1955 |

OTHER REFERENCES

Peyrot: Chemical Abstracts, vol. 42, page 410a (1948), as abstracted from Industries Plastiques, vol. 3, pages 201–206 and 246–251 (1947).